US008585271B2

(12) United States Patent
Demma

(10) Patent No.: US 8,585,271 B2
(45) Date of Patent: Nov. 19, 2013

(54) DOOR SILL LIGHTING FOR A MOTOR VEHICLE

(75) Inventor: Dino Demma, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 13/441,171

(22) Filed: Apr. 6, 2012

(65) Prior Publication Data

US 2012/0257407 A1    Oct. 11, 2012

(30) Foreign Application Priority Data

Apr. 8, 2011  (DE) .......................... 10 2011 016 408

(51) Int. Cl.
*F21V 7/04* (2006.01)

(52) U.S. Cl.
USPC ........... 362/602; 362/600; 362/603; 362/605; 362/604; 362/611; 362/612

(58) Field of Classification Search
None
See application file for complete search history.

(56) References Cited

U.S. PATENT DOCUMENTS

| 4,811,507 A | 3/1989 | Blanchet |
| 7,218,095 B2 * | 5/2007 | Hill .......................... 324/750.27 |
| 7,901,120 B2 * | 3/2011 | Droste et al. .................. 362/509 |
| 2005/0213351 A1 | 9/2005 | Yang |

FOREIGN PATENT DOCUMENTS

| DE | 4305653 A1 | 3/1994 |
| DE | 20312518 U1 | 12/2003 |
| DE | 202005017408 U1 | 1/2006 |
| DE | 102008064233 A1 | 6/2009 |
| DE | 102009028937 A1 | 3/2011 |
| EP | 2028046 A1 | 2/2009 |
| JP | 6032171 A | 2/1994 |
| WO | 2006047306 A1 | 5/2006 |

OTHER PUBLICATIONS

German Patent Office, German Search Report dated Mar. 12, 2012 for German Application No. DE102011016408.1.

* cited by examiner

*Primary Examiner* — Natalie Walford
(74) *Attorney, Agent, or Firm* — Ingrassia Fisher & Lorenz, P.C.

(57) ABSTRACT

A door sill lighting for a motor vehicle is described. The door sill lighting comprises an outer sill trim having a plurality of seamlessly interconnected layers. A partial region of an outer layer is transparent and cooperates with at least one light source. The partial region of the outer layer comprises edge sides and an optical fiber layer. The optical fiber layer has distributed light-scattering nanoparticles in its volume. Light from the light source can be coupled into an edge side of the optical fiber layer.

20 Claims, 5 Drawing Sheets

DOOR SILL LIGHTING FOR A MOTOR VEHICLE

CROSS-REFERENCE TO RELATED APPLICATION

This application claims priority to German Patent Application No. 10 2011 016 408.1, filed Apr. 8, 2011, which is incorporated herein by referenced in its entirety.

TECHNICAL FIELD

The technical field generally relates to a door sill lighting for a motor vehicle. The door sill lighting comprises an outer sill trim of an outer sill. At least one partial region of the outer sill trim is transparent and cooperates with at least one light source.

BACKGROUND

A door tread plate for motor vehicles in the area of an outer sill is known from the document DE 10 2008 064 233 A1. Conventional door tread plates usually made of black plastic are provided with a peripheral flexible seal at least on three sides. Superior vehicles usually have decorative layers as door tread plates and symbols let into the layers. Galvanized chrome inserts or chrome-look layers are used for this purpose. The door tread plate for motor vehicles known from the above document is formed from a plurality of interconnected plastic layers. From the plastic layers a surface section of the door tread plate is formed by a printed, transparent inmolt film, the rear side whereof is firmly connected, at least in sections, to a plastic component made of a transparent plastic material, which can be used as optical fiber for a lighting source.

It is at least one object to provide a door sill lighting, which has an improved robustness and possibly comprises a reduced number of seamlessly connected layers. In addition, other objects, desirable features and characteristics will become apparent from the subsequent summary and detailed description, and the appended claims, taken in conjunction with the accompanying drawings and this background.

SUMMARY

An embodiment of the invention comprises a door sill lighting for a motor vehicle. The door sill lighting comprises an outer sill trim of an outer sill. At least one partial region of the outer sill trim is transparent and cooperates with at least one light source. The partial region comprises edge sides and an optical fiber layer. The optical fiber layer has distributed light-scattering nanoparticles in the volume of the partial region. Light from the light source can be coupled into at least one edge side of the optical fiber layer.

The door sill lighting can consist almost solely of a single partial region which in turn is formed by an optical fiber material. The optical fiber material has light-scattering nanoparticles in the volume thereof, which makes the door sill lighting light up in a light-scattering manner in the at least one partial region by means of light emitted on the edge side.

Light-scattering nanoparticles are understood in this connection to be particles having a diameter of about 10 to about 200 nanometers. The nanoparticles isotropically scatter incident light where preferably colorless particles having a refractive index which differs from that of the optical fiber material by about $0.06 \leq \Delta n \leq 0.4$ are used. The light-scattering nanoparticles are distributed in the volume and can additionally be surrounded by a cladding layer, which improves the embedding in the optical fiber material. As a result of the embedding of the light-scattering nanoparticles, an optical fiber material is obtained which is largely transparent in the unilluminated state while it shows effective emission of light on all sides when light is coupled in via edge sides.

An outer sill trim comprising such a material is able to shine so brightly in the partial region of the optical fiber layer that a bottom region below and in front of vehicle doors can be illuminated from the outer sill trim, which increases the safety when getting into and leaving the vehicle and minimizes the risk of injury.

In a further embodiment, the outer sill trim has a curvature in cross-section, which goes over from a vertical alignment into an angle of inclination. The rear side of the outer sill trim has a reflection-coated layer in a first partial region. As a result of this reflection-coated layer, the light of the light sources introduced via the edge sides is in practice reflected onto the bottom region using the curvature of the outer sill. To this end, the optical fiber layer follows the profile of the outer sill.

To this end, the optical fiber layer of the door sill lighting comprises a longitudinal-side upper edge side, a longitudinal-side lower edge side, and a transverse-side front edge side, and a transverse-side rear edge side, where the longitudinal-side edge sides have a length which is a multiple of the transverse-side edge sides. It can thus be advantageous to couple the light into the transverse-side edge sides, for example, by means of two light sources, a front light source and a rear light source.

Preferably compact light sources in the form of light-emitting diodes are used as light sources. The light sources can couple light from the edge sides into the optical fiber layer, whose volume makes the coupled-in light shine through the nanoparticles distributed in the volume in a light-scattering manner toward the front side of the optical fiber layer in the at least one partial region.

In a further embodiment, it is provided that the optical fiber layer follows the profile of the outer rim in cross-section and in the at least one partial region has a curvature which goes over from a vertical alignment into an angle of inclination.

It is also provided that the rear side of the optical fiber layer has a reflection-coated layer in the area of the curvature of a first partial region of the optical fiber layer and the lower front side of the first partial region remains free from the reflection-coated layer.

It is furthermore provided to apply a front-side reflection-coated layer or covering layer in a second partial region and to leave a lettering or symbols or pattern non-reflection-coated or non-covered so that these shine through the front side of the second partial region of the door sill lighting and, when the vehicle is stationary, can give the observer information, for example, on the vehicle type.

The lower front side of the first partial region remaining free from reflecting coating can additionally have a profile of a Fresnel lens and ensure that the bottom region below the vehicle doors and in front of the vehicle doors is uniformly illuminated. Such a Fresnel lens can also be applied as a film seamlessly by means of a transparent adhesive adapted in refractive index to the front side of the first partial region.

In a further embodiment, light from light sources can also be coupled into the transverse-side edge sides so that light-scattering nanoparticles which are distributed at least homogeneously in the volume of the partial regions of the optical fiber layer can brightly illuminate the outer sill trim over its entire length.

Furthermore, it is provided to dispose the second partial region of the optical fiber layer having the lettering or having symbols or having patterns above the door sill lighting. Thus, in the volume of the lettering or the symbols or the pattern, a higher concentration of nanoparticles can be provided than in the surrounding optical fiber layer in order to make the lettering or the symbols or the patterns light up more brightly than its surroundings.

As a result of this cost-effective, space-saving, and robust door sill lighting variant of illumination of the bottom region near the door, lighting devices in the door can be dispensed with. With this door sill lighting, getting in and out of the motor vehicle is safer for persons. Finally, compared with conventional illuminants which cannot be used with closed doors, the door sill lighting can provide for persons getting in and out safely at all times when the vehicle is stationary.

BRIEF DESCRIPTION OF THE DRAWINGS

The present invention will hereinafter be described in conjunction with the following drawing figures, wherein like numeral denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
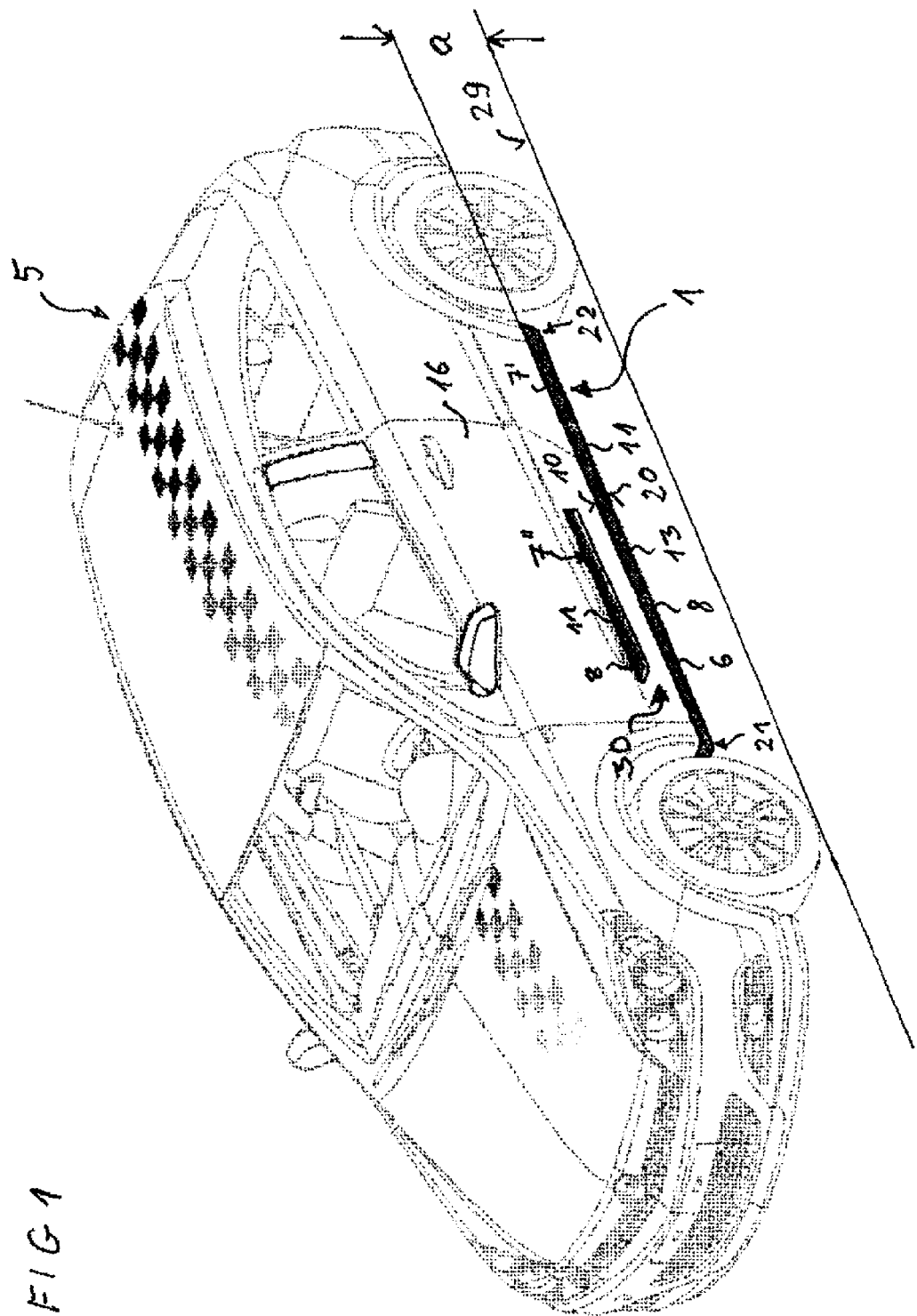
FIG. 1 shows a schematic perspective view of a vehicle having a door sill lighting according to a first embodiment.

FIG. 1 shows a schematic perspective view of a vehicle 5 having a door sill lighting 1 which is applied to an outer sill 35 of a door sill 30 as outer sill trim 6. In this first embodiment the outer sill trim 6 is formed by an optical fiber layer 11. The optical fiber layer 11 has light-scattering particles 13 in its volume so that when the door sill lighting 1 is switched on, the outer sill trim 6 lights up in a first partial region.

In darkness the door sill lighting 1 forms an aid for getting in and out so that it is possible to get into the vehicle 5 with increased safety and also get out of the vehicle 5 again, especially as now when the door sill lighting 1 is switched on, the distance a between a roadway 29 and the door sill 30 can be better estimated.

A plurality of partial regions 7' and 7" of the door sill 30 can be fitted with an optical fiber layer 11 so that the spatial depth of the door sill 30 can be better estimated in the dark. The door sill lighting 1 has a longitudinal-side upper edge side 10 and a longitudinal-side lower edge side 20 and is delimited toward the front by a transverse-side front edge side 21 and toward the back by a transverse-side rear edge side 22. The length of the longitudinal-side edge sides 10, 20 is a multiple of the length of the transverse-side edge sides 21 and 22.

In order to make the second partial region 7" of the door sill lighting 1 light up, this can be fitted with respectively one light source on the transverse side while a plurality of light sources are distributed over the longitudinal-side edges 10 and/or 20 through the optical fiber layer 11 of the outer sill trim 6, as shown in the following FIGS. 3 and 4 in order to couple edge-side light into the optical fiber layer 11 and make nanoparticles 13 light up in a light-scattering manner over the length of the outer sill trim 6.

Figure 2:
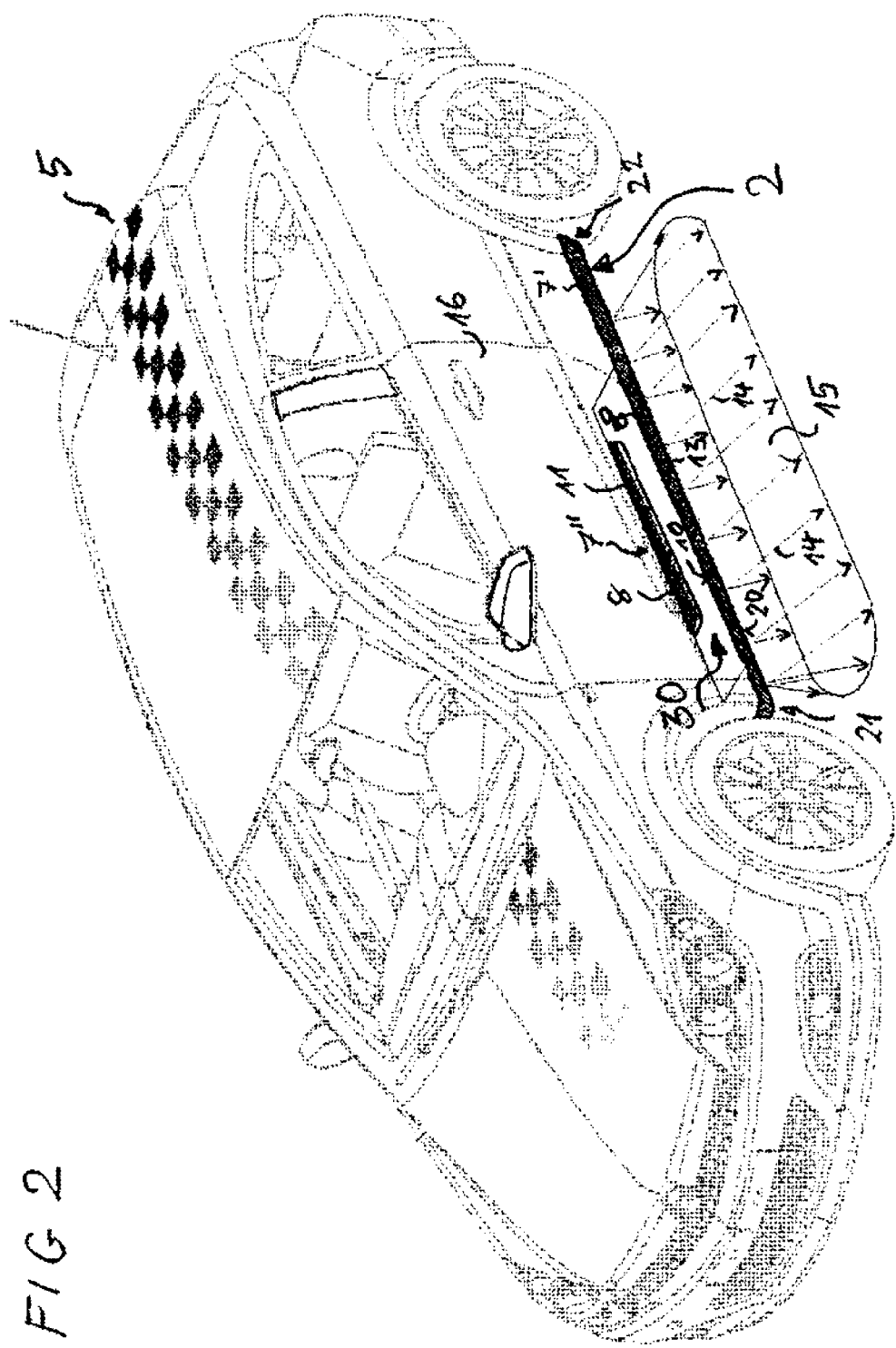
FIG. 2 shows a schematic perspective view of a vehicle having a door sill lighting according to a second embodiment.

FIG. 2 shows a schematic perspective view of a vehicle 5 having a door sill lighting 2 according to a second embodiment. In this case, the curvature of the door sill is used to light up a bottom region 15 in the sill region of the vehicle door 16. Such illumination of the bottom region 15 in the sill region of a vehicle door 16 is not only helpful if the key or other objects fall down when getting in but also improves the safety when getting in and getting out of the vehicle 5. To this end, a plurality of light sources are disposed in the door sill lighting 2, which introduce light into the optical fiber layer 11 via the lower edge side 20 or the upper edge side 10 and with the aid of the door sill 30, so that the nanoparticles 13 in the first partial region 7' scatter light 14 in the direction of the bottom region 15. This is explained in detail by means of the following FIG. 3.

Figure 3:
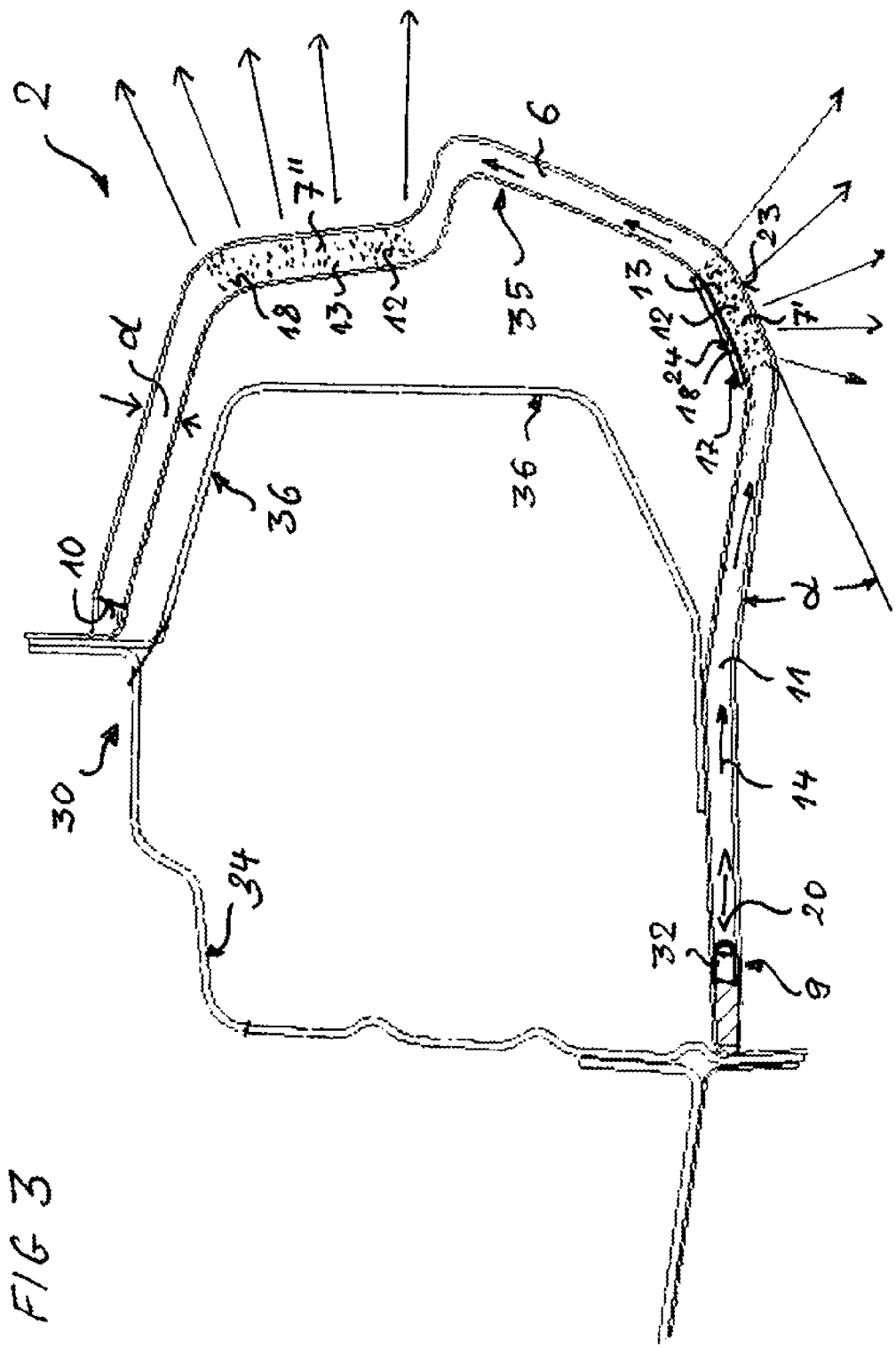
FIG. 3 shows a cross-section through a door sill lighting according to FIG. 2.

FIG. 3 shows a cross-section through a door sill lighting 2. The door sill 30 has an inner sill 34 and an outer sill 35 and can be reinforced in a dimensionally stable and twisting-resistant manner by a central support 36. An outer sill trim 6 is disposed on the outer sill 35, which follows the profile or the contour of the outer sill 35. The outer sill trim 6 consists of a transparent clear optical fiber layer 11 of an optical fiber material such as PMMA (polymethylmethacrylate) and has a thickness d of a light guide plate. The thickness d is shown enlarged in FIG. 3 for presentation reasons.

The optical fiber layer 11 can surround the entire outer sill 35 from a lower edge side 20 to an upper edge side 10 or only partial regions. The optical fiber layer 11 can have light-scattering nanoparticles 13 in its entire volume 12, as shown in FIG. 3, only in a first partial region 7' and in a second partial region 7", which is symbolized by a dotted area of the partial regions 7' and 7". The light-scattering nanoparticles 13 are not visible upon inspection through the optical fiber layer 11 and light up in a light-scattering manner when a light source 9 at the edge side couples light 14 into the optical fiber layer 11.

To this end, in this embodiment a light-emitting diode 32 is disposed on the lower edge side 20. The coupled-in light 14 is scattered in a region of the curvature 17 of the first partial region 7' of the optical fiber layer 11, where the scattered light is directed by the curvature in the direction of the arrow A onto the bottom region shown in FIG. 2. This scattered light can be intensified by a reflection-coated layer 24 on the rear side 18 of the first partial region 7'.

In the curvature 17 the outer sill 35 and therefore the optical fiber layer 11 also goes over from a horizontal alignment at an angle of inclination a into the first lower partial region 7'. The outer sill trim 6 is adapted positively to this curvature 17 so that the optical fiber layer 11 is also curved. The rear side 18 of the optical fiber layer 11 has a reflection-coated layer 24.

Figure 4:
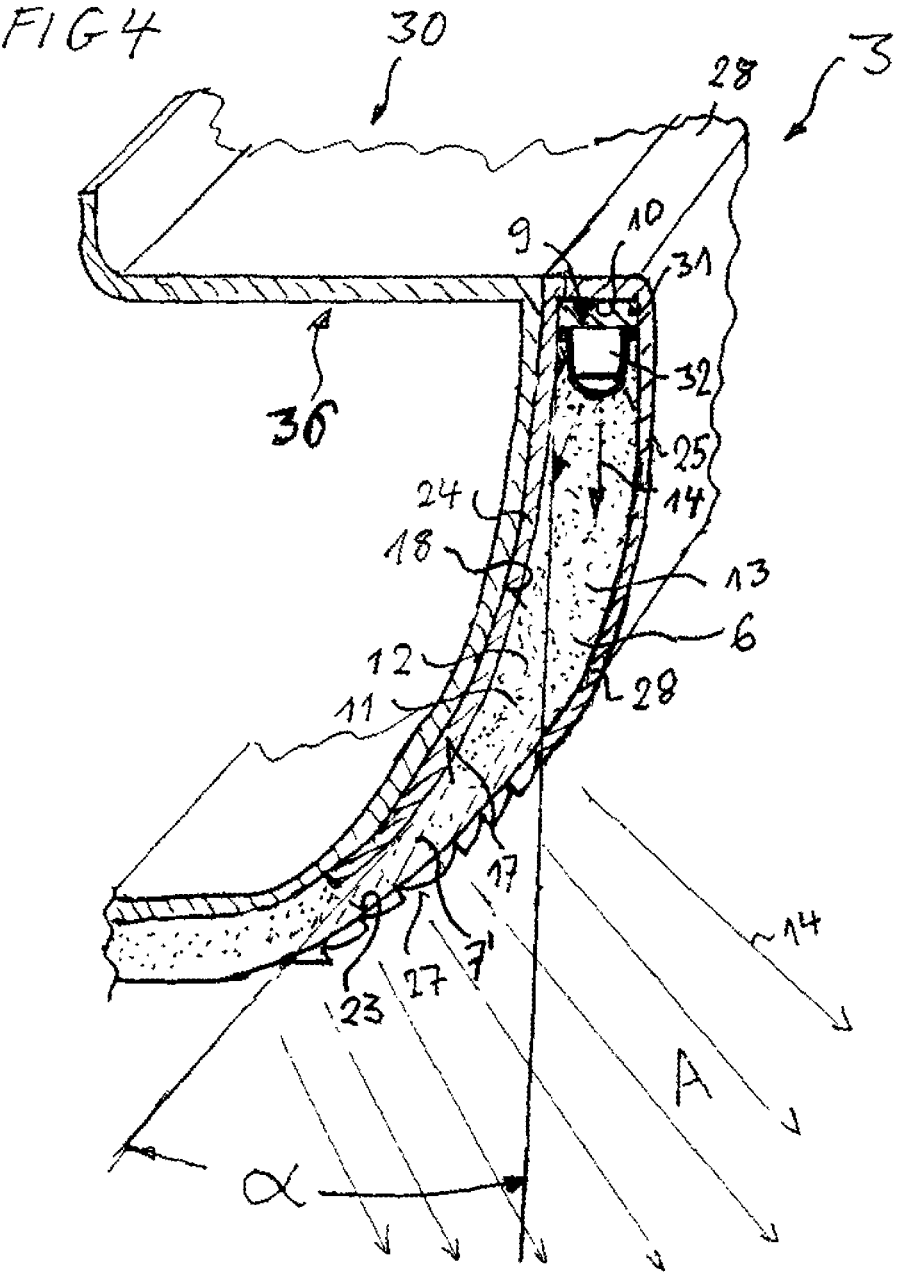
FIG. 4 shows a cross-section through a door sill lighting according to a third embodiment.

FIG. 4 shows a cross-section through a door sill lighting 3 according to a third embodiment. Here again, the curvature 17 of the door sill 30 is used to provide a correspondingly curved reflection-coated layer 24 on the rear side 18 of the optical fiber layer 11. Unlike FIG. 3, a protective layer 28 is now provided on the longitudinal-side upper edge side 10 of the optical fiber layer 11. Below the protective layer 28 light sources are embedded in the optical fiber material of the optical fiber layer 11. The light 14 of the light sources 9 is scattered by the nanoparticles 13 in the volume 12 and emitted through the curved reflection-coated layer 19 in an intensified manner to the bottom region in the direction of the arrow A.

The optical fiber layer 11 has a lens profile 27 of an elongate Fresnel lens in the curvature 17 toward the front side 23 so that the light of the light source 9 scattered by the light-scattering nanoparticles 13 is aligned concentrated over the length of the door sill lighting 3 in the direction of the arrow A onto the bottom region, as shown in FIG. 2. The light source 9 is disposed below the protective layer 28 on an insulating board 31, which provides the light-emitting diode 32 with current via appropriate terminals. Such a light-emitting diode 32 can either be embedded or potted into the optical fiber layer 11 as shown here or disposed in a recess of the optical fiber layer 11.

Figure 5:
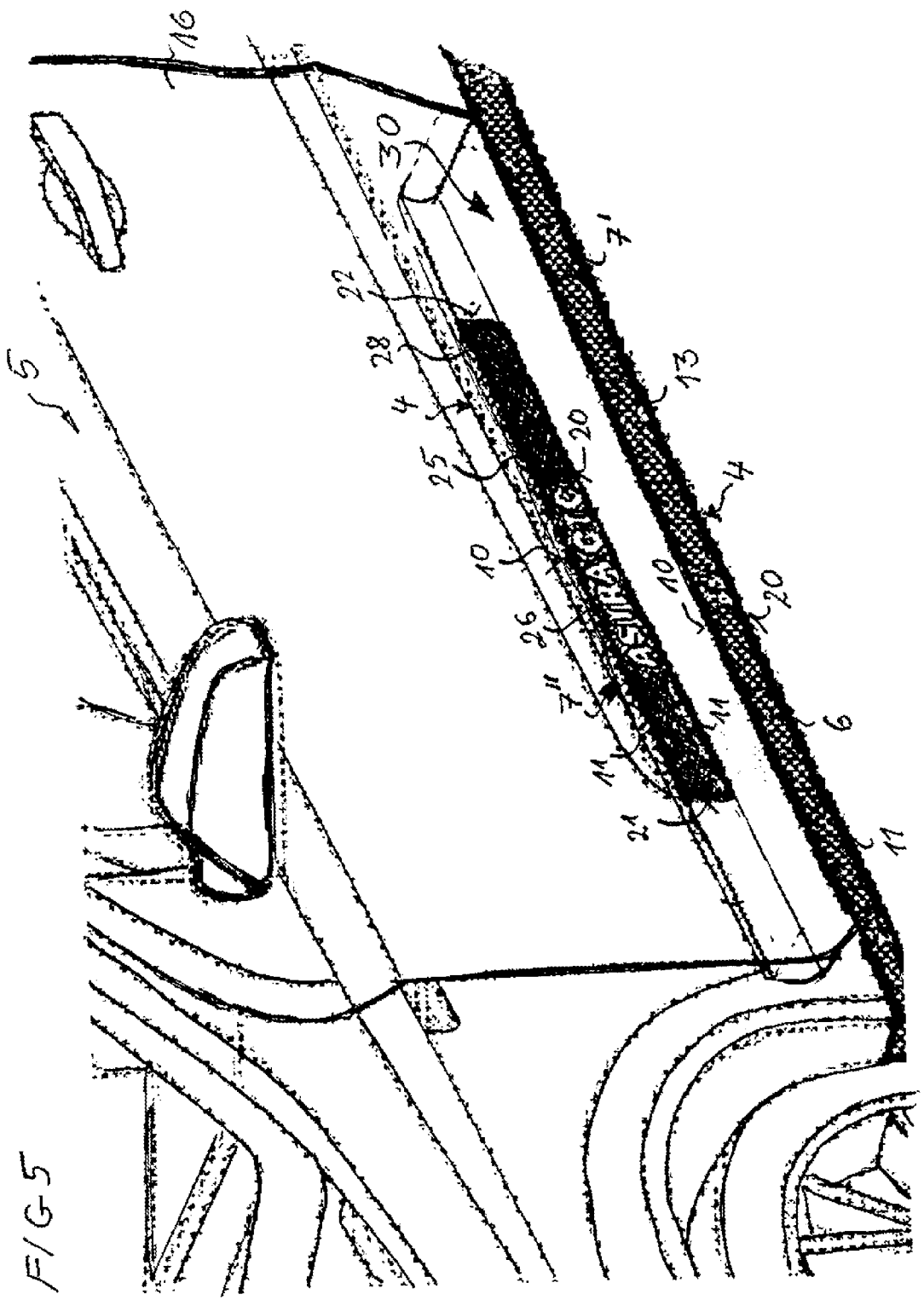
FIG. 5 shows a schematic perspective view of a part of a vehicle having a door sill lighting according to a fourth embodiment.

FIG. 5 shows a schematic perspective view of a part of a vehicle 5 with a door sill lighting 4 according to a fourth embodiment. In this embodiment, the second partial region 7" is disposed in the inner area of the door sill, which is significantly shorter in its longitudinal extension than the first partial region 7' of the door sill lighting 4, whereby it is possible to dispose merely two light sources in the form of light-emitting diodes, not shown, on the transverse-side front and rear edge sides 21 and 22 of the second partial region 7".

The protective layer on the optical fiber layer can cover the entire front side of the second partial region 7" of the door sill lighting 4 and merely has recesses for a lettering 26, which here for example shines out from the opaque protective layer 28. On the other hand, it is also possible to provide an optically opaque reflection-coated layer 25, which leaves only the lettering 26 free, on the upper side of the optical fiber layer 11.

Furthermore, the entire front side of the optical fiber layer 11 can also remain uncoated and transparent and an increased concentration of light-scattering nanoparticles 13 compared with the surrounding optical fiber layer can be provided only in the region of the lettering and the characters or in the region of patterns and other symbols. It is thereby possible to make a three-dimensional appearance of the symbols, letters, or patterns light up in the optical fiber layer 11.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. Door sill lighting for a motor vehicle comprising:
an outer sill trim of an outer sill, wherein a partial region of the outer sill trim is transparent and cooperates with a light source,
wherein the partial region comprises edge sides and an optical fiber layer, which has distributed light-scattering nanoparticles at least in a volume of the partial region and wherein light from the light source can be coupled into an edge side of the optical fiber layer.

2. The door sill lighting according to claim 1, wherein the light-scattering nanoparticles are configured to scatter light of the light source such that bottom regions below and in front of vehicle doors of the motor vehicle are illuminated.

3. The door sill lighting according to claim 1, wherein the outer sill trim has a curvature in cross-section, which goes over from a vertical alignment into an angle of inclination.

4. The door sill lighting according to claim 3, wherein a rear side of the optical fiber layer having a curved cross-section has a reflection-coated layer.

5. The door sill lighting according to claim 1, wherein the optical fiber layer comprises a longitudinal-side upper edge side, a longitudinal-side lower edge side, and a transverse-side front edge side and a transverse-side rear edge side.

6. The door sill lighting according to claim 5, wherein the longitudinal-side upper edge side and the longitudinal-side lower edge side have lengths that are multiples of the transverse-side front edge side and the transverse-side rear edge side.

7. The door sill lighting according to claim 5, wherein the optical fiber layer follows a profile of the outer sill trim in cross-section.

8. The door sill lighting according to claim 7, wherein a rear side of the optical fiber layer has a reflection-coated layer in a first partial region and wherein a front side is free from the reflection-coated layer in the first partial region.

9. The door sill lighting according to claim 8, wherein a front-side reflection-coated layer of a second partial region has a lettering that remains non-reflection-coated.

10. The door sill lighting according to claim 8, wherein a profile of the first partial region on the front side has a profile of a Fresnel lens that uniformly illuminates a bottom region below and in front of vehicle doors of the motor vehicle.

11. The door sill lighting according to claim 5, wherein light from light sources are coupled into the transverse-side front edge side, the transverse-side rear edge side, or both.

12. The door sill lighting according to claim 1, wherein the light-scattering nanoparticles are disposed homogeneously in the volume of the optical fiber layer.

13. The door sill lighting according to claim 1, wherein the optical fiber layer having a lettering or having symbols or having patterns is disposed above the door sill lighting.

14. The door sill lighting according to claim 13, wherein in a volume of the lettering or the symbols or the patterns, a higher concentration of nanoparticles is provided than in the surrounding optical fiber.

15. A motor vehicle having a door sill lighting, the door sill lighting comprising:
an outer sill trim of an outer sill, wherein a partial region of the outer sill trim is transparent and cooperates with a light source,
wherein the partial region comprises edge sides and an optical fiber layer, which has distributed light-scattering nanoparticles at least in a volume of the partial region and wherein light from the light source can be coupled into an edge side of the optical fiber layer.

16. The door sill lighting according to claim 15, wherein the light-scattering nanoparticles are configured to scatter light of the light source such that bottom regions below and in front of vehicle doors of the motor vehicle are illuminated.

17. The door sill lighting according to claim 15, wherein the outer sill trim has a curvature in cross-section, which goes over from a vertical alignment into an angle of inclination.

18. The door sill lighting according to claim 17, wherein a rear side of the optical fiber layer having a curved cross-section has a reflection-coated layer.

19. The door sill lighting according to claim 15, wherein the optical fiber layer comprises a longitudinal-side upper edge side, a longitudinal-side lower edge side, and a transverse-side front edge side and a transverse-side rear edge side.

20. The door sill lighting according to claim 19, wherein the longitudinal-side upper edge side and the longitudinal-side lower edge side have lengths that are multiples of the transverse-side front edge side and the transverse-side rear edge side.

* * * * *